United States Patent [19]

Von Berg

[11] Patent Number: 5,607,109
[45] Date of Patent: Mar. 4, 1997

[54] FUEL INJECTION NOZZLE AND METHOD OF MAKING

[76] Inventor: Richard M. Von Berg, 4403 Alvin St., Saginaw, Mich. 48603

[21] Appl. No.: 356,565

[22] Filed: Dec. 15, 1994

[51] Int. Cl.$^6$ ........................................ B05B 1/14
[52] U.S. Cl. ............................. 239/568; 239/601
[58] Field of Search ................... 239/568, 553.5, 239/553.3, 553, 548, 601, 590.5, 590.3, 590, 589; 29/890.1, 890.142, 890.143

[56] References Cited

U.S. PATENT DOCUMENTS 2,968,150  1/1961  Goebel et al. ................. 239/601 X
3,200,479  8/1965  Peterson ......................... 29/890.142
3,687,375  8/1972  Griffiths .......................... 239/601 X

*Primary Examiner*—Lesley D. Morris
*Attorney, Agent, or Firm*—Learman & McCulloch

[57] ABSTRACT

A liquid fuel injector nozzle has a body terminating at one end in a plurality of substantially tear drop shaped discharge outlets through which fuel may be discharged in a spray and in such manner as to produce spaced apart vena contracta. The nozzle is produced by providing a cylindrical extension at one end of the injector body and forming a plurality of axially extending, circumferentially spaced slots in the extension to produce alternating slots and fingers. The tips of the fingers are deformed into engagement to convert the extension to conical configuration, thereby producing the tear drop shaped openings.

14 Claims, 2 Drawing Sheets

FUEL INJECTION NOZZLE AND METHOD OF MAKING

This invention relates to a nozzle which is particularly adapted for use as a fuel injector nozzle and through which liquid fuel may be discharged in such manner as to promote efficient mixing of such fuel with air in an internal combustion engine cylinder. The invention also relates to methods for producing such nozzle.

BACKGROUND OF THE INVENTION

Nozzles for injecting liquid fuel into a cylinder of an engine and mixing the fuel with a gas in the cylinder are well known. Conventional nozzles typically employ one or more single dimensional discharge orifices, usually of circular cross section, which interact with liquid flowing through the orifice to produce a single vena contracta downstream of the nozzle in a lower pressure zone to facilitate mixing of the fuel and the gas. Nozzles currently in use not only include the pintle type for producing a circular spray, but also include annular rings, jets, fluted jets, opposing jets, and a lip-nozzle, some of which produce a single vena contracta.

For maximum power and fuel economy, it is essential that the fuel be introduced into the combustion chamber of a cylinder in such manner that it is completely consumed without producing smoke and unburned hydrocarbons. A nozzle constructed in accordance with the invention provides a uniform distribution of fuel into a combustion chamber and produces multiple vena contracta downstream from the nozzle, thereby providing substantially better mixing of the fuel and gas in the combustion chamber and, consequently, more complete combustion of the fuel.

SUMMARY OF THE INVENTION

A nozzle constructed in accordance with the invention has a tubular body open at one end for enabling the introduction into the body of a measured quantity of fuel under controlled pressure. At the opposite end of the injector body is a conical projection having a plurality of circumferentially spaced outlet openings therein through which fuel may be discharged into the combustion chamber of a cylinder of an internal combustion engine. Each of the outlets is substantially tear drop in configuration and tapers in a direction toward the free end of the projection. The configuration of each outlet opening is such that fuel discharged therethrough produces two vena contracta downstream from the nozzle, thereby producing multiple zones of turbulence and more efficient mixing of the fuel and the gas within the cylinder.

The fuel outlet openings of the injector are extremely small, thereby presenting considerable difficulties in the formation thereof. These difficulties are overcome in a nozzle constructed in accordance with the invention by providing at the discharge end of the injector body axial slots of uniform width and length spaced apart by lands or fingers, following which the fingers are deformed radially inwardly so as to join the tips of the fingers and produce at the discharge end of the body a conical projection in which a plurality of the tear drop shaped discharge outlets are formed. The radially inward deformation of the fingers at the discharge end of the injector body forms slits where the tips of the fingers engage one another and such tips may be welded or fused to one another so as to seal the tip of the injector body. As a consequence, all fuel must be discharged from the tear drop shaped outlet openings.

THE DRAWINGS

The presently preferred embodiment of the invention is disclosed in the accompanying drawings, wherein.

THE PREFERRED EMBODIMENTS

Figure 1:
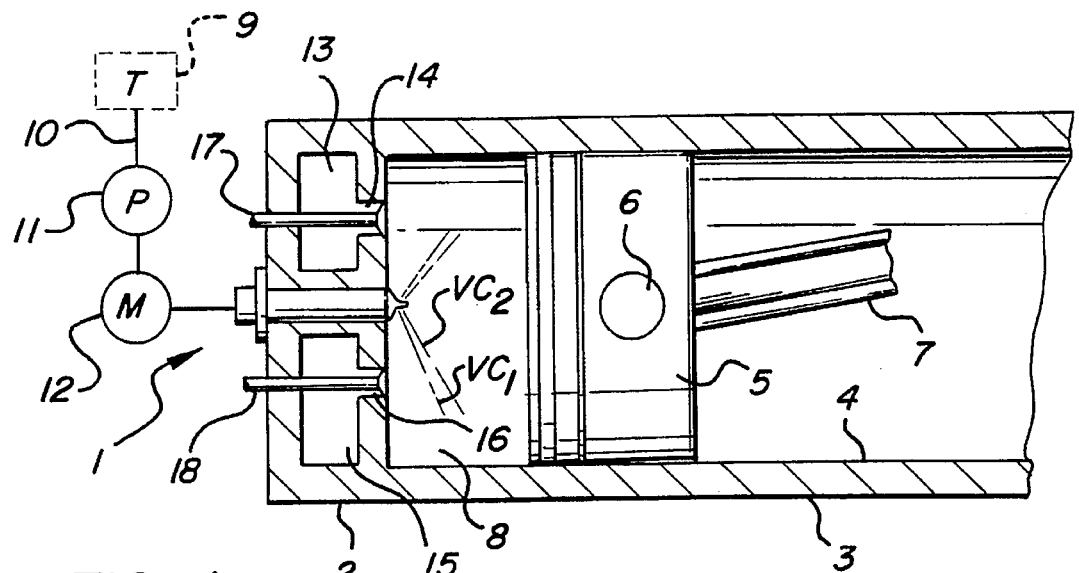
FIG. 1 is a diagrammatic view illustrating a nozzle constructed in accordance with the invention incorporated in an internal combustion engine cylinder and coupled to apparatus for delivering fuel to and through the nozzle.
Figure 2:
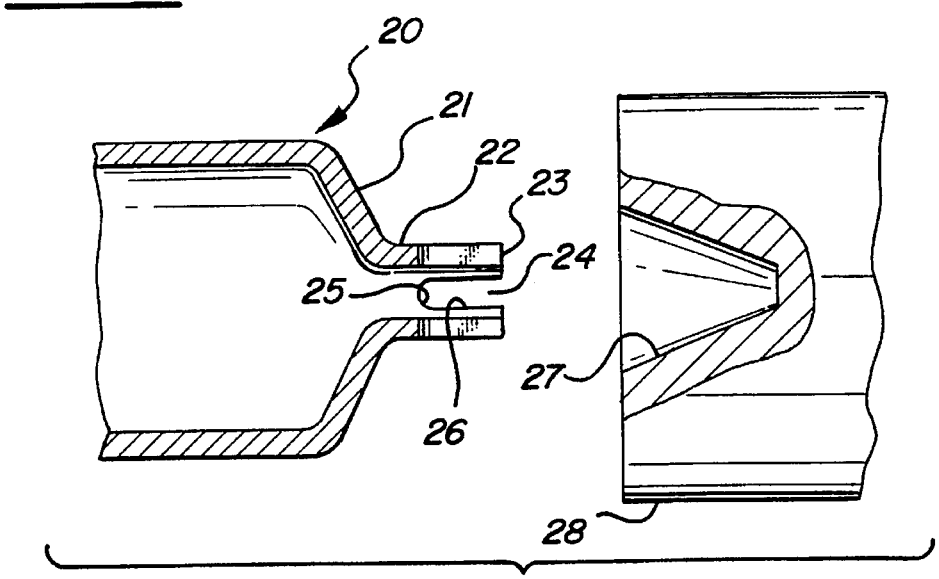
FIG. 2 is an exploded, fragmentary, partly sectional view of the discharge end of the nozzle and apparatus for deforming the free end of the nozzle.
Figure 3:
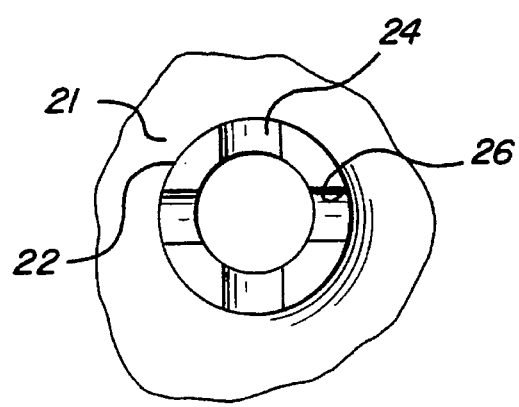
FIG. 3 is an end elevational view of the free end of the nozzle.
Figure 4:
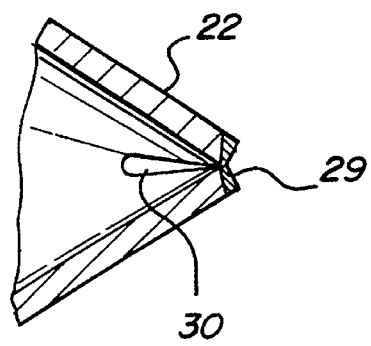
FIG. 4 is a fragmentary, sectional view of the free end of the nozzle following its deformation.

A nozzle constructed in accordance with the invention has a body designated generally by the reference character 1 in FIG. 1 and is adapted to be fitted into an opening formed in a head 2 of a cylinder 3 of an internal combustion engine. The cylinder 3 has a bore 4 in which a piston 5 is reciprocable and pinned as at 6 to a piston rod 7 which is coupled to a crank shaft (not shown) in the conventional manner. A variable volume combustion chamber 8 is formed between the cylinder head 2 and the piston 5.

Fuel from a tank 9 is delivered through a line 10 to and through an opening in the nozzle 1 via a pump 11 and a conventional metering device 12. Adjacent the combustion chamber 8 is an air manifold 13 which communicates with the combustion chamber via an inlet port 14. Also adjacent the combustion chamber is an exhaust manifold 15 which communicates with the combustion chamber via an exhaust port 16. The inlet port 14 is periodically opened and closed by a valve 17 in a conventional manner and the exhaust port 16 similarly is opened and closed periodically by an exhaust valve 18. A spark or glow plug (not shown) extends into the combustion chamber in the usual manner to ignite the fuel therein. Apart from the injector nozzle 1 the apparatus thus far described forms no part of the invention.

The injector nozzle 1 comprises a tubular body 20 having an inlet end in communication with the fuel delivery line 10. The opposite end of the body 2 has a transversely extending wall 21 which terminates in a cylindrical projection or extension 22 wall which is coaxial with the body 20 but of lesser diameter. The extension 22 has a free end 23 from which a plurality of slots 24 extend axially. Each slot preferably is of uniform length and width and each slot terminates in a base 25 which is concave in a direction toward the free end 23. Each slot is separated by a land or finger 26 of the wall 22. The length and width of the slots may vary, depending upon the kind of liquid that is to be discharged from the injector, as well as the pressure under which the liquid is discharged. Typically, however, each slot will have an initial, substantially uniform width of 0.006–0.008 inch and a length of 0.100 inch. Slots of such small dimension effectively can be produced using wire electrical discharge machining techniques, but any other suitable slot-forming technique may be utilized.

Following forming of the slots 24 it is preferred that deburring be accomplished by forcing an abrasive slurry through the injector body, thereby avoiding the necessity of having to subject the injector to a break-in process.

Following forming of the slots 24 and the deburring operation, the free end 23 of the extension 22 is introduced to a conical cavity 27 in a deforming tool 28 which may be slid over the extension 22 so as to deform the fingers 26 radially inwardly to convert the cylindrical extension 22 to a conical configuration. The radially inward deformation of the fingers 26 causes their free ends or tips to move inwardly into abutting relation and form slits 29 forming a regular cone. The inward deformation of the fingers will cause the free end of the extension wall 22 to be convex outwardly of the body and also will cause the slots 24 to form a tear drop shaped outlet opening 30, the larger end of which is arcuate and the smaller end of which is adjacent the free end 23 of the extension. The slits 29 then may be welded by a tungsten inert gas process, or any other suitable process which effects sealing of the slits.

Figure 5:
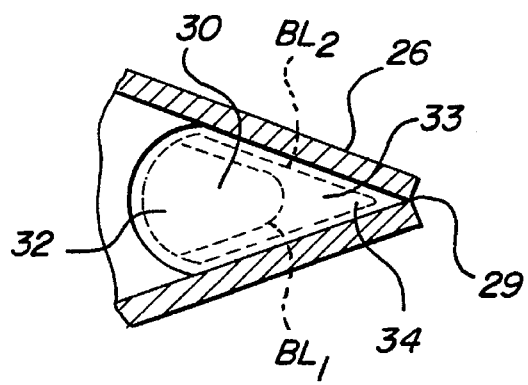
FIGS. 5–9 are end elevational views of nozzles having different numbers of discharge openings therein.
Figure 6:
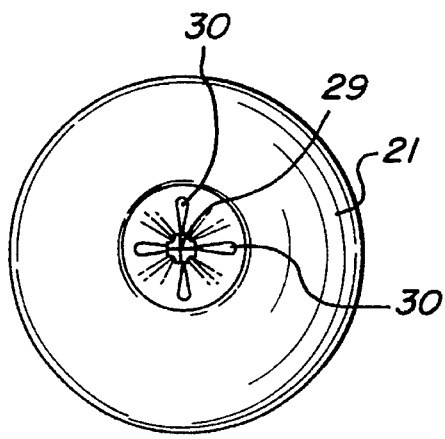
Figure 7:
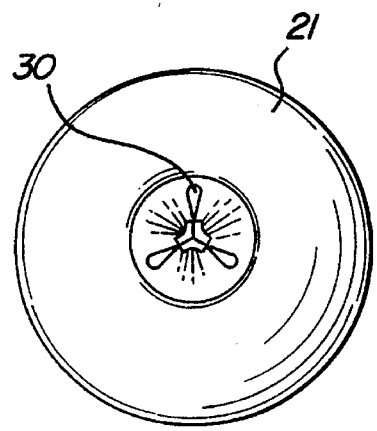
Figure 8:
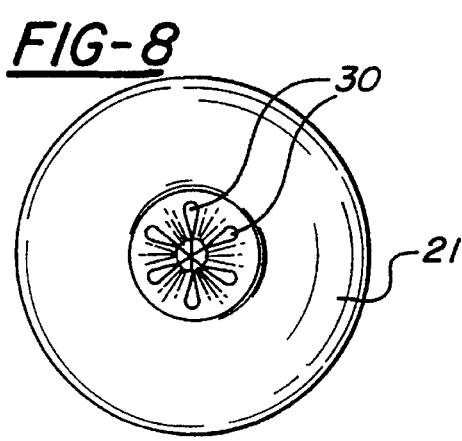
Figure 9:
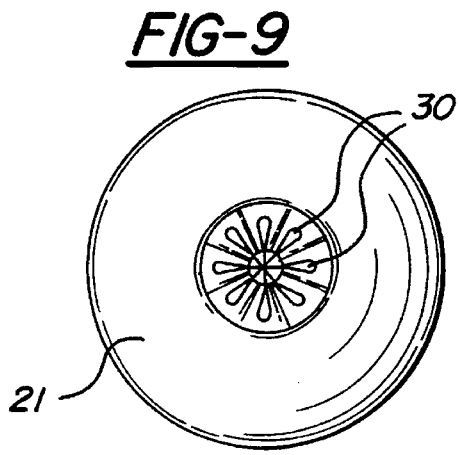

In the embodiment shown in FIGS. 5 and 6, there are four slots and four fingers and, consequently, four outlet openings 30. In FIG. 7, there are three slots and three fingers and, consequently, three outlet openings 30. In FIG. 8, there are six slots, six fingers, and six discharge outlet openings, whereas in FIG. 9 there are eight slots, eight fingers, and eight outlet openings. In each instance the outlet openings are circumferentially and reciprocally spaced from one another.

When fuel or other liquid is delivered periodically according to the delivery cycle to the injector nozzle 1 under pressure the fuel will be discharged through each of the openings 30 so as to form a circumferential spray. Preferably, that portion of the spray which issues from each opening 30 is segment shaped and subtends an angle which is sufficient to enable the adjacent segments to abut one another and form a substantially continuous 360° spray, thereby providing the maximum distribution throughout the area of the combustion chamber.

By providing a plurality of openings 30 spaced uniformly circumferentially of the nozzle, it is possible to provide a relatively thin spray at a relatively low fuel pressure and velocity and still achieve adequate atomization of the fuel. The thinner spray also provides more exposure of the fuel to oxygen in the combustion chamber, thereby promoting a clean burning process. In addition, the thinner spray strata enable the fuel to be heated sooner to achieve more rapid combustion than otherwise would be the case. It thus is possible to obtain highly satisfactory distribution of atomized fuel throughout the cross sectional area of the combustion chamber and at lower fuel pressures and velocities than is required in conventional, high pressure systems.

A most significant advantage of the disclosed construction is that the liquid periodically discharged through each opening 30 generates multiple, axially spaced vena contracta designated $VC_1$ and $VC_2$ in FIG. 1. The multiple vena contracta are generated as a result of the liquid exiting each nozzle outlet opening 30 from two axially spaced locations designated 32 and 33 in FIG. 5. This result is achieved because the tear drop configuration of each opening 30 produces first and second boundary layers $BL_1$ and $B_2$, respectively, as flow through each opening is initiated, reaches a maximum, and subsequently decreases to no flow in accordance with the periodic fuel injection cycle. As the flow fluctuates, the Reynolds number changes to produce the boundary layers and the axially spaced vena contracta, thereby accomplishing more thorough mixing of the fuel with air in the combustion chamber which, in turn, promotes more complete combustion.

The disclosed embodiments are representative of presently preferred forms of the invention, but are intended to be illustrative rather than definitive thereof. The invention is defined in the claims.

I claim:

1. A nozzle comprising a tubular body open at one end for communication with a source of fluid and terminating at its opposite end in a conical extension having a wall tapering substantially uniformly to a closed end; and a plurality of circumferentially spaced tear drop shaped outlet openings in said wall, each of said outlet openings tapering in a direction toward said closed end.

2. The nozzle according to claim 1 wherein said body is substantially cylindrical in a direction from said extension toward said open end.

3. A nozzle comprising a cylindrical body open at one end and having a conical extension at its opposite end, said extension having a larger end joined to said body and a smaller end projecting axially of and beyond said body, said smaller end of said extension being sealed, and said extension having a generally uniformly tapering wall provided with a plurality of circumferentially spaced, tear drop shaped openings therein, each of said openings tapering in a direction toward said smaller end of said extension.

4. The nozzle according to claim 3 wherein said openings have an arcuate end which is remote from said smaller end of said extension.

5. The nozzle according to claim 3 wherein said smaller sealed end is convex outwardly of said body.

6. A method of forming a nozzle at one end of a tubular body having a reduced diameter cylindrical wall projecting beyond said one end and terminating in a free end, said method comprising forming at least one axially extending opening in said wall; radially deforming inwardly said wall following the formation of said at least one opening to close said free end of said wall and taper said at least one opening in a direction toward said free end.

7. The method according to claim 6 including forming a plurality of openings in said extension, said plurality of said openings being uniformly circumferentially spaced from one another.

8. The method according to claim 6 including fusing said wall at said free end thereof to seal said free end.

9. The method according to claim 6 wherein said at least one opening has an end remote from said free end which is concave in a direction toward said free end.

10. The method according to claim 6 wherein said wall comprises a reduced diameter extension of said body.

11. The method according to claim 6 including forming a plurality of circumferentially spaced openings in said wall and deforming said wall radially inwardly to produce a regular cone at said free end thereby forming a plurality of uniform openings tapering toward said free end.

12. The method according to claim 11 wherein the deformation of said wall produces a plurality of slits at said free end, and sealing said slits.

13. A method of forming a nozzle having a conical tip at one end provided with a plurality of fluid outlet openings between smaller and larger ends of said conical tip, said method comprising providing a cylindrical member, forming a plurality of circumferentially spaced slots in said cylindrical member extending axially from an end of said member toward but terminating short of the opposite end of said member thereby providing a plurality of circumferentially spaced fingers, having free ends, deforming said fingers radially inward to cause said free ends to engage one another and convert said slots to tear drop shaped openings which taper in the direction of the tips of said fingers.

14. The method according to claim 13 including sealing the free ends of said tips together.

* * * * *